United States Patent [19]

Sherrod et al.

[11] Patent Number: 4,615,122
[45] Date of Patent: Oct. 7, 1986

[54] METHOD FOR PROVIDING STEAM AND HOT AIR FOR HOODED DRYING CYLINDERS

[75] Inventors: Earle H. Sherrod, Outagamie County; Clarence J. Lamers, Brown County; Kenneth C. Smits, Winnegabo County, all of Wis.

[73] Assignee: Kimberly-Clark Corporation, Neenah, Wis.

[21] Appl. No.: 597,954

[22] Filed: Apr. 9, 1984

[51] Int. Cl.<sup>4</sup> .............. F26B 3/00; F26B 3/02; F26B 3/24

[52] U.S. Cl. .............................. 34/18; 34/23; 34/114; 34/119; 34/124

[58] Field of Search .............. 34/86, 114, 116, 119, 34/124, 122, 18, 23, 25; 122/7 R; 165/DIG. 12; 432/91, 8, 59, 60

[56] References Cited

U.S. PATENT DOCUMENTS

| | | | |
|---|---|---|---|
| 2,892,263 | 6/1959 | Hornboster | 34/120 |
| 3,208,158 | 9/1965 | Smith | 34/122 |
| 4,026,035 | 5/1977 | Dyer et al. | 34/114 |
| 4,253,245 | 3/1981 | Perrault | 34/119 |
| 4,426,959 | 1/1984 | McCurley | 165/DIG. 12 |
| 4,447,964 | 5/1984 | Gardner | 34/119 |
| 4,462,868 | 7/1984 | Oubridge et al. | 34/114 |

Primary Examiner—Albert J. Makay
Assistant Examiner—David W. Westphal
Attorney, Agent, or Firm—Gregory E. Croft

[57] ABSTRACT

A waste heat boiler is used to provide hot air to the drying hood of a Yankee dryer and to provide steam to the inside of the Yankee drying cylinder.

6 Claims, 2 Drawing Figures

METHOD FOR PROVIDING STEAM AND HOT AIR FOR HOODED DRYING CYLINDERS

BACKGROUND OF THE INVENTION

In the paper industry, hooded drying cylinders, i.e. Yankee dryers, etc. are standard equipment for making a variety of paper products such as tissues and paper towels. A dryer generally consists of a large, rotating cylinder which is internally heated with steam. A major portion of the surface of the cylinder is encompassed by a hood which is continuously provided with hot air for drying the sheet and exhausting moisture. The wet paper web to be dried is briefly adhered to the outer surface of the rotating cylinder on a continuous basis. In the short time the web is in contact with the rotating cylinder, most of the moisture is driven out of the web by a combination of the dryer surface heat and the hot air. The moisture is carried away by the hot air circulating through the hood.

A difficulty with such drying systems is that large quantities of energy are required to provide the steam for the drying cylinder and hot air for the dryer hood. The steam is generally supplied from a boiler house, often remotely located, which is a major capital expenditure and costly to operate. Hot air for the dryer hood is generally supplied by the combustion of natural gas or light oil in a direct fired burner or by steam coils.

Therefore, because of the high costs of energy as a percent of manufacturing cost, there is a need for a more economical method of providing hot air and steam to such dryers.

SUMMARY OF THE INVENTION

Broadly, the invention resides in a process which uses a waste heat fired boiler to provide steam to a steam-heated drying cylinder and/or provide hot air to an accompanying hot air drying hood. The waste heat boiler, when used in accordance with this invention, can provide two process flow loops: one which recycles hood drying air and the other which recycles drying cylinder blow through steam and condensate to produce steam for the drying cylinder. This unique flow scheme eliminates the need for an expensive boiler plant and conserves energy relative to conventional process designs.

More specifically, in one aspect, the invention resides in an improved web drying process which incorporates a steam-heated drying cylinder in cooperation with a hot air drying hood, the improvement comprising: (a) heating air in a gas burner for subsequent use in a waste heat boiler and drying hood; (b) generating steam in the waste heat boiler using the heated air from said burner as a heat source; (c) directing the air from the waste heat boiler into the drying hood; (d) exhausting the air from the drying hood; and (e) recycling a major portion of the exhaust air to the burner of step (a).

In a further aspect, the invention resides in an improved web drying process which incorporates a steam-heated drying cylinder in cooperation with a hot air drying hood, the improvement comprising: (a) generating steam for the drying cylinder with a waste heat boiler which vaporizes condensate from the drying cylinder using a source of hot air; and (b) recycling the vaporized condensate from a flash tank as steam to the drying cylinder.

Preferably, the invention resides in a process which combines the two above-mentioned aspects.

These and other aspects of the invention will be described in greater detail with reference to the Drawing.

DETAILED DESCRIPTION OF THE DRAWING

Figure 1:
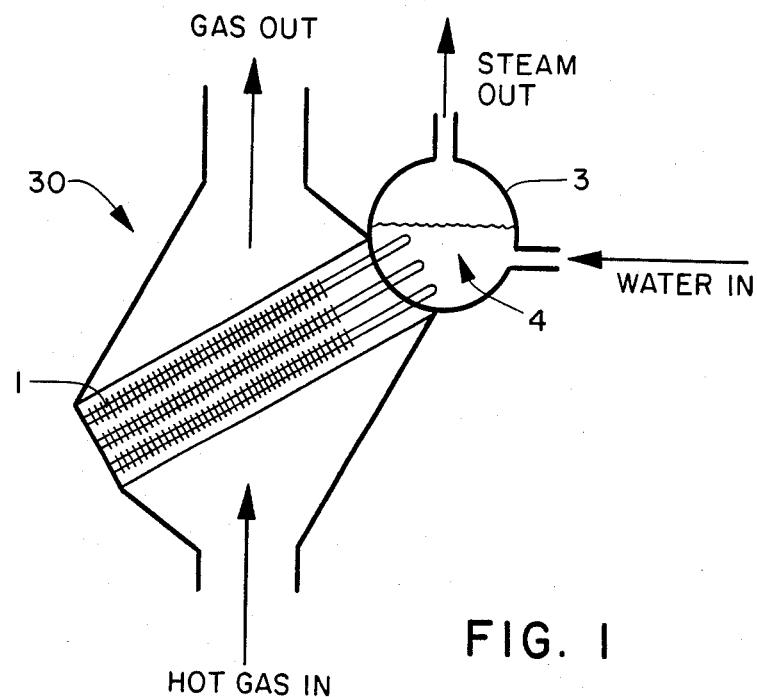
FIG. 1 is a schematic representation of a waste heat boiler useful for purposes of this invention.

Directing attention to FIG. 1, a waste heat boiler useful in the process of this invention is illustrated. Waste heat boilers are commercially available apparatus designed to generate steam from hot air. A suitable device of this type is the Q-Pipe TM waste heat boiler manufactured by Q-dot Corporation, shown in FIG. 1. However, other waste heat boilers can also be used for purposes of the invention. Specifically, the waste heat boiler 30 shown in FIG. 1 operates by passing hot gas over a multiplicity of partially finned, inclined, sealed tubes 1 which contain a heat transport fluid. The tubes extend into a water reservoir 3 which contains water 4 provided from a suitable source, as shown, for steam formation. As the hot gases transfer heat to the finned portion of the tubes, the heat transport fluid inside the tubes vaporizes and travels upwardly toward the cooler end of the tube submerged in the water. The water absorbs heat from the vaporized heat transport fluid through the tube wall and vaporizes into steam as shown. At the same time, the vaporized heat transport fluid condenses and flows down the tube to repeat the cycle. The gases leaving the waste heat boiler have a lower temperature as a result of the heat exchange to form the steam.

Figure 2:
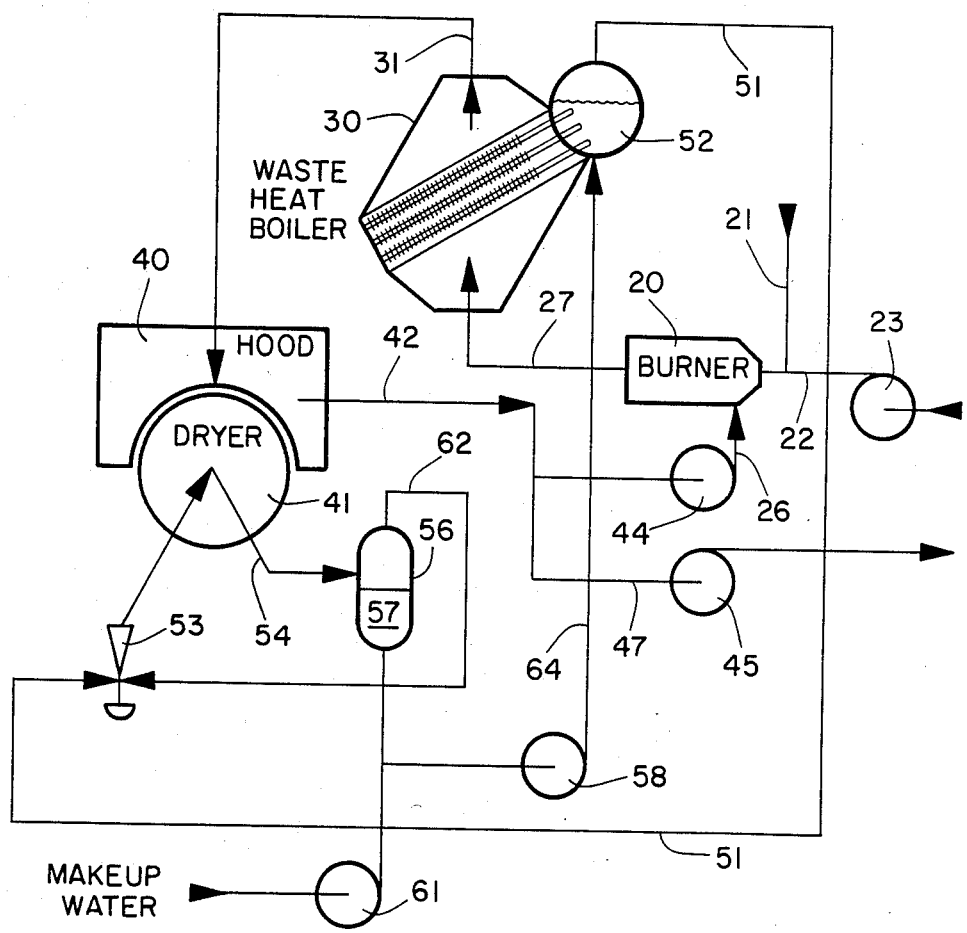
FIG. 2 is a schematic flow diagram of a process incorporating the features of this invention.

FIG. 2 represents a schematic flow diagram of a web drying process utilizing the features of this invention. It will be appreciated by those skilled in the art that the flow diagram is intended only as an illustration and that other apparatus and piping, such as bypass valves and lines, will be present in an actual installation. Beginning with the burner 20, a source of pressurized natural gas 21 or other suitable burner fuel is combined with a source of combustion air 22, preferably provided by a suitable blower 23, to generate heat within the burner. Air to be heated 26 is passed through the burner, which heats the air to a temperature substantially greater than that desired for web drying. Typically, the air will be heated to a temperature of about 1500° F. The heated air 27 is then directed to a waste heat boiler 30, which cools the air to a temperature of from about 1500° F. down to about 500° F.–800° F. by indirectly transferring heat to the water within the waste heat boiler to generate steam. The cooled air 31 leaving the waste heat boiler is directed to the hood 40 of the web drying cylinder 41. In the hood, the hot air contacts the web to be dried, such as a wetlaid paper web, and removes moisture. A major portion of the moist exhaust air 42 is recycled back to the burner with the aid of a supply fan 44 to repeat the cycle. In order to eliminate moisture build-up in the system, however, a portion 47 of the moist exhaust air must be removed from the system via exhaust fan 45 wherein the heat value can be recovered and utilized in a suitable manner. The relative amount of moist air removed depends upon the moisture content. In general, the moisture level will be from about 0.2 to about 0.8 lbs. water per lb. of dry air. The amount of the exhaust air removed from the system will accordingly be from about 5 to about 10 volume percent.

The other loop of the process begins at the waste heat boiler 30 wherein saturated steam 51 generated therein is directed to the inside of the drying cylinder 41 to heat the web to be dried on the surface of the drying cylinder. The temperature and pressure of this steam will depend on the temperature of the air 27 used to vaporize the water 52 in the waste heat boiler. Typical values for the steam 51 are from about 150 to about 200 psi and accordingly from about 366° F. to about 381° F. The newly generated steam is then used in a thermocompressor 53 to lower its pressure down to about 70–125 psi and directed into the drying cylinder, preferably at about 100 psi. The steam transfers heat to the inner surface of the drying cylinder and is condensed and thereby further reduced in pressure to about 60–100 psi, preferably about 85 psi. The lower pressure steam 54 leaving the drying cylinder passes through a flash tank 56 where condensate 57 is collected and recycled to the waste heat boiler via boiler feed pump 58. Additional demineralized make-up water can be supplied as needed via pump 61. Generally, make-up water amounts to about 15 percent of the boiler feed water 64. The steam 62 leaving the flash tank is directed back to the thermocompressor 53 where it is combined with the newly generated steam 51 from the waste heat boiler and fed back into the drying cylinder.

It will be appreciated that the foregoing description, set forth for purposes of illustration, is not to be construed as limiting the scope of this invention, which is defined by the following claims.

We claim:

1. In a web drying process wherein the web is applied to the surface of a steam-heated drying cylinder which is partially enclosed by a drying hood continuously supplied with hot air, the improvement comprising:
    (a) continuously heating air in a burner and passing the heated air through a waste heat boiler;
    (b) generating steam in the waste heat boiler using the heated air from the burner as a heat source;
    (c) directing the heated air passing from the waste heat boiler into the drying hood, wherein the moisture content of the heated air is increased;
    (d) exhausting the moistened air from the drying hood; and
    (e) heating a major portion of the moistened air in the burner as set forth in step (a).

2. The process of claim 1 further comprising: (a) directing the steam generated in the waste heat boiler into the drying cylinder wherein heat is transferred to the surface of the drying cylinder causing the steam to condense; and (b) recycling the resulting condensate to the waste heat boiler to be converted into steam.

3. In a web drying process wherein the web is applied to the surface of a steam-heated drying cylinder which is partially enclosed by a drying hood continuously supplied with hot air, the improvement comprising:
    (a) continuously generating steam in a waste heat boiler which vaporizes water to form steam using hot air as a heat source, wherein the heat source is exhaust air from the drying hood which has been heated in a burner and passed through the waste heat boiler;
    (b) directing the steam into the drying cylinder wherein heat is transferred to the surface of the drying cylinder causing the steam to condense; and
    (c) recycling the condensate as water to the waste heat boiler of step (a).

4. The process of claim 3 wherein the hot air passing through the waste heat boiler is directed to the drying hood.

5. The process of claim 4 wherein the hot air directed to the drying hood has a temperature of from about 500° F. to about 800° F.

6. The process of claim 5 wherein the pressure of the steam leaving the waste heat boiler is from about 150 to about 200 pounds per square inch.

* * * * *